United States Patent
Toyooka (10) Patent No.: US 8,724,033 B2
(45) Date of Patent: May 13, 2014

(54) IMAGE DISPLAY APPARATUS AND IMAGE DISPLAY METHOD

(75) Inventor: Takashi Toyooka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1471 days.

(21) Appl. No.: 11/882,050

(22) Filed: Jul. 30, 2007

(65) Prior Publication Data

US 2008/0030629 A1 Feb. 7, 2008

(30) Foreign Application Priority Data

Aug. 4, 2006 (JP) .................................. 2006-213190

(51) Int. Cl.
*H04N 5/44* (2011.01)
*H04N 5/64* (2006.01)
*H04N 9/31* (2006.01)
*G06K 9/40* (2006.01)

(52) U.S. Cl.
USPC ............................ 348/725; 348/744; 382/254

(58) Field of Classification Search
None
See application file for complete search history.

(56) References Cited

U.S. PATENT DOCUMENTS

| | | | |
|---|---|---|---|
| 7,050,074 B1 | 5/2006 | Koyama | |
| 7,391,406 B2 * | 6/2008 | Yamamoto et al. | 345/102 |
| 7,515,160 B2 * | 4/2009 | Kerofsky | 345/600 |
| 7,548,357 B2 * | 6/2009 | Moriya | 358/520 |
| 2003/0174882 A1 * | 9/2003 | Turpin et al. | 382/162 |
| 2006/0187158 A1 * | 8/2006 | Wakabayashi et al. | 345/87 |
| 2007/0195211 A1 * | 8/2007 | Fujimori | 349/5 |
| 2010/0103206 A1 * | 4/2010 | Kamada et al. | 345/690 |
| 2011/0128306 A1 * | 6/2011 | Utsumi et al. | 345/690 |

FOREIGN PATENT DOCUMENTS

| | | |
|---|---|---|
| JP | A-2001-8219 | 1/2001 |
| JP | A 2004-325629 | 11/2004 |
| JP | A 2005-257761 | 9/2005 |
| JP | A-2006-47464 | 2/2006 |
| JP | A-2006-129105 | 5/2006 |

* cited by examiner

*Primary Examiner* — Ricky Chin
(74) *Attorney, Agent, or Firm* — Oliff PLC (57) ABSTRACT

The invention provides an image display method of displaying an image on a projection plane in response to an input video signal. The method includes steps of: emitting each of multiple color lights having mutually different hues; modulating the each of the multiple color lights; controlling light emission amounts of the multiple color lights individually, based on an analyzed result of the video signal; and correcting tone values of the video signal to generate a driving signal, for providing the modulation. The tone values are corrected such that a plurality of luminance profiles of the multiple color lights approximate each other, the plurality of luminance profiles being varied independently by individually controlling the amounts of light emission, each of the plurality of luminance profiles representing a relation between the tone value and relative luminance value for each of the modulated multiple color light.

5 Claims, 7 Drawing Sheets

Light Intensity of 100%

Fig.6

Light Intensity of 10%

IMAGE DISPLAY APPARATUS AND IMAGE DISPLAY METHOD

BACKGROUND

1. Technical Field

The present invention relates to a light control technique for projectors and diversity of other image display apparatuses.

2. Related Art

Commonly used projectors have the advantages of the lowered power consumption and the decreased heating values by output control of a light source as well as regulation of transmitted light with a liquid crystal element or another light control element. Some projectors are equipped with solid light sources that individually output different color lights R (red), G (green), and B (blue) (for example, laser diodes LD or light emitting diodes LED). One proposed technique applied to the projector equipped with solid light sources performs output control of the light sources to attain efficient reduction of the power consumption and efficient decrease of the heating value. For example, in the case of reproduction of a reddish dark image (having a greater rate of the R component and smaller rates of the G and B components), the output control of the light sources lowers the outputs of the solid light sources of the G and B color lights than the output of the solid light source of the R color light as disclosed in JP-A-2004-325629. JP-A-2005-257761 also discloses related art.

However, the hue fidelity of a projected image has not been considered in the prior art technique, which is affected by individual control of the outputs of the R, G, and B solid light sources. This problem is not restrictive in liquid crystal projectors but is found in diversity of image display apparatuses equipped with multiple light sources for emitting multiple different color lights.

SUMMARY

An advantage of some aspect of the invention is to provide a technique of enhancing the hue fidelity in image display with individual control of outputs of multiple light sources having different hues.

The invention provides an image display method of displaying an image on a projection plane in response to an input video signal. The method includes steps of: emitting each of multiple color lights having mutually different hues; modulating the each of the multiple color lights; controlling light emission amounts of the multiple color lights individually, based on an analyzed result of the video signal; and correcting tone values of the video signal to generate a driving signal, for providing the modulation. The tone values are corrected such that a plurality of luminance profiles of the multiple color lights approximate each other, the plurality of luminance profiles being varied independently by individually controlling the amounts of light emission, each of the plurality of luminance profiles representing a relation between the tone value and relative luminance value for each of the modulated multiple color light.

In the image display method of the invention, the method performs the tone value correction to make the multiple luminance profiles of the multiple color lights varied independently by the individual control of the amounts of light emission, close to one another. This arrangement desirably reduces the degradation in hue fidelity due to the varying luminance profiles of the respective color lights.

In one aspect of the method of the invention, the tone values are corrected on each of the multiple color lights to reduce the variations of the respective luminance profiles caused by the individual control of the amounts of light emission. In another aspect of the image display method of the invention, the tone values are corrected on each of the multiple color lights to make the luminance profiles of all other color lights approach to the luminance profile of a specific color light having a smallest amount of light reduction by the control of the amount of light emission among the multiple color lights. The latter structure of the image display apparatus has an additional advantage of restricting an increasing degree of a minimum luminance by light reduction, thus enhancing the contrast ratio.

In one preferable embodiment of the method of the invention, the method further includes a step of: determining a correction value for the tone value correction, by multiplying a correction value for an expected maximum degree of light reduction by a factor specified corresponding to an amount of light reduction.

The image display method of this embodiment requires a one-dimensional table (occupying a smaller memory capacity) for storage of correction values for the expected maximum degree of light reduction, in place of a two-dimensional table (occupying a greater memory capacity) for storage of correction values corresponding to two inputs of the degree of light reduction and the changed tone value. This arrangement desirably saves the memory capacity required for storing the table of the correction values and ensures adequate correction with the small memory capacity.

In another preferable embodiment of the invention, the method further includes steps of; measuring the amounts of light emissions of the multiple color lights individually; and determining degrees of the individual control of the amounts of light emission according to the individually measured amounts of light emission.

The tone value correction based on the observed amounts of light emission desirably eliminates the effect of a potential deviation of the actual values from 'target values' due to individual differences or time change in the control of the amounts of light emission from the multiple light sources and ensures the highly accurate tone value correction.

The technique of the invention is also applicable to image display apparatuses, such as a projector, and may also be actualized by diversity of other applications including computer programs and firmware causing the computer to attain the functions of the image display apparatus or the image display method, recording media with such computer programs recorded therein, and expendable containers equipped with storage devices for storing such computer programs.

DESCRIPTION OF EXEMPLARY EMBODIMENT

The invention is explained in the following sequence based on embodiments.

Figure 1:
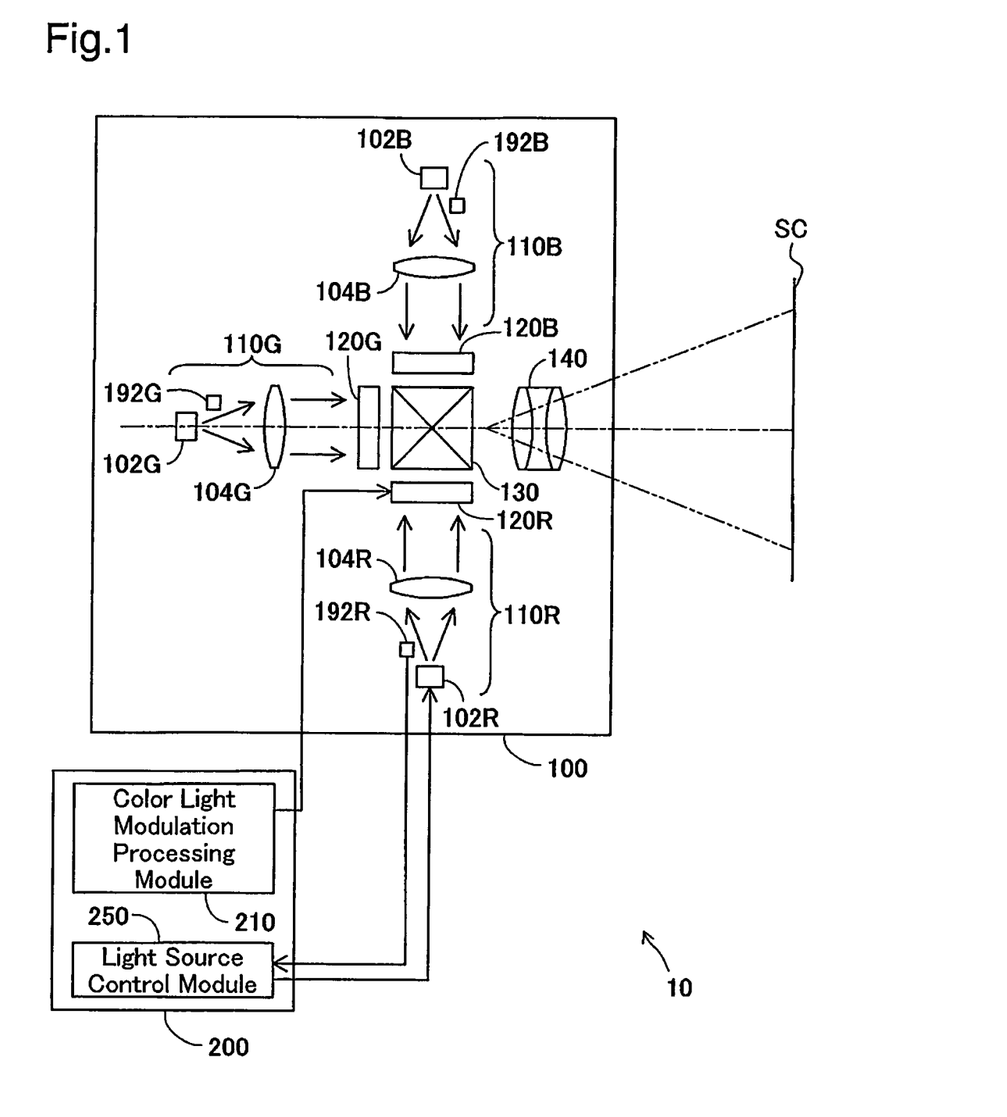
FIG. 1 is a block diagram schematically illustrating the structure of a liquid crystal projector 10 in one embodiment of the invention.

A. Fundamental Structure of Liquid Crystal Projector
B. Light Source Control and Light Modulation Processing in First Embodiment
C. Light Source Control and Light Modulation Processing in Second Embodiment
D. Modifications A. Fundamental Structure of Liquid Crystal Projector FIG. 1 is a block diagram schematically illustrating the structure of a liquid crystal projector 10 in one embodiment of the invention. The liquid crystal projector 10 has an optical system 100 to project images on a screen SC and a controller 200 to control projected light. The optical system 100 includes three illumination optical systems 110R, 110G, and 110B that respectively emit color lights of three colors R, G, and B, three liquid crystal light valves 120R, 120G, and 120B that respectively modulate the three emitted color lights, a cross dichroic prism 130 that combines the three modulated color lights to composite light, and a projection lens system 140 that projects the composite light onto the screen SC.

The illumination optical systems 110R, 110G, and 110B respectively have light emission units 102R, 102G, and 102B emitting the color lights of the three colors R, G, and B, light sensors 192R, 192G, and 192B measuring the amounts of light emissions from the light emission units 102R, 102G, and 102B, and lenses 104R, 104G, and 104B.

Figure 2:
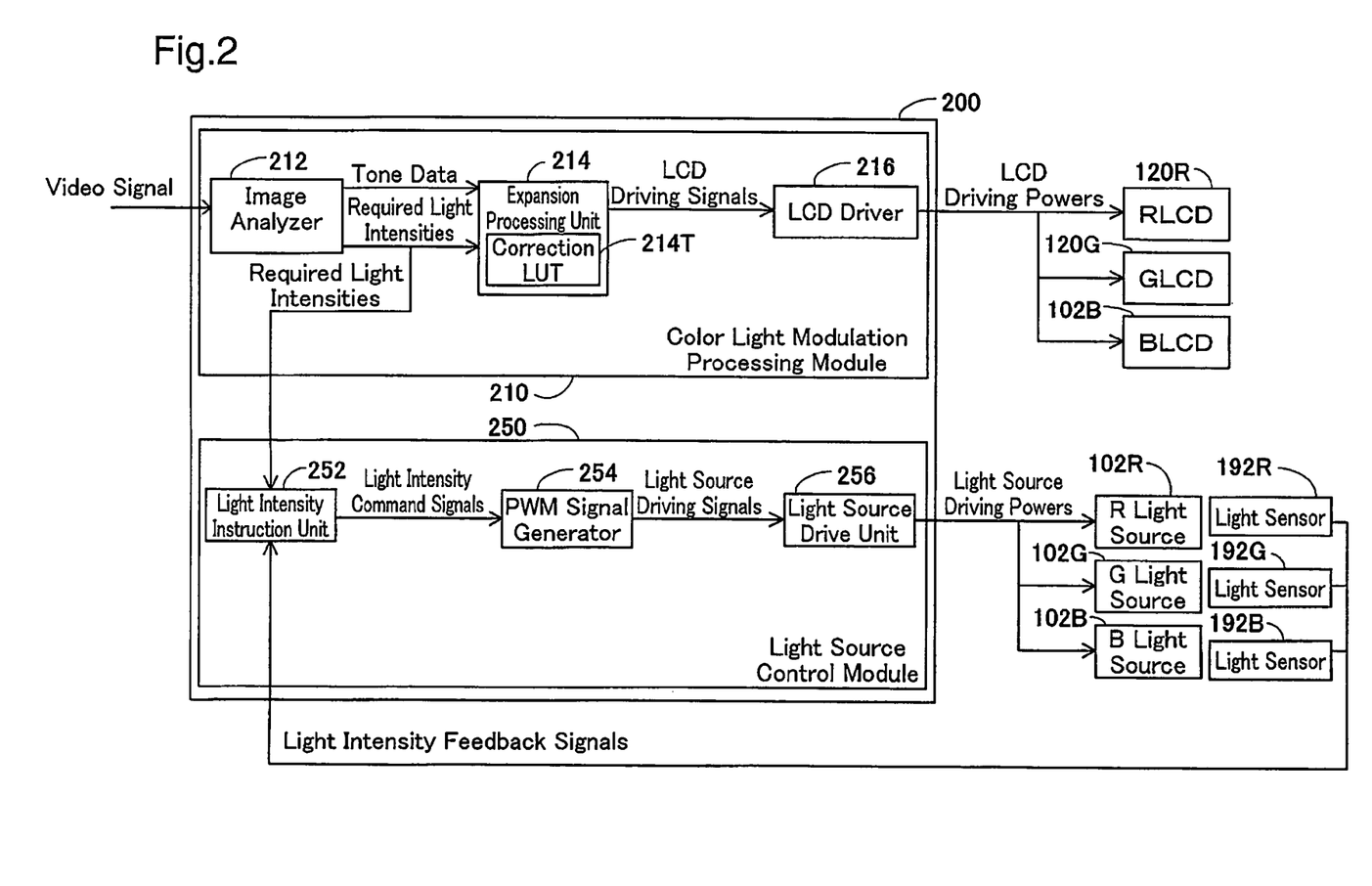
FIG. 2 shows the internal structure of the controller 200 in the embodiment.

FIG. 2 shows the internal structure of the controller 200 in the embodiment. The controller 200 has a color light modulation processing module 210 that executes a required series of processing to control the three liquid crystal light valves 120R, 120G, and 120B for modulation of the respective color lights, and a light source control module 250 that controls the light intensities output from the three illumination optical systems 110R, 110G, and 110B.

The color light modulation processing module 210 includes an image analyzer 212 that analyzes each video signal and computes tone data and required light intensities, an expansion processing unit 214 that performs an expansion process accompanied with light reduction to generate LCD driving signals, and an LCD driver 216 that supplies LCD driving powers to the three liquid crystal light valves 120R, 120G, and 120B corresponding to the LCD driving signals. The light source control module 250 includes a light intensity instruction unit 252 that generates light intensity command signals based on the computed required light intensities and light intensity feedback signals, a PWM signal generator 254 that modulates the pulse widths in response to the light intensity command signals and generates light source driving signals, and a light source drive unit 256 that supplies light source driving powers to the three illumination optical systems 110R, 110G, and 110B corresponding to the light source driving signals.

The color light modulation processing module 210 of this embodiment is equivalent to the 'color light modulation processing module' in the claims of the invention. The optical system 100 and the light source control module 250 of this embodiment are equivalent to the 'multiple light sources', the 'light modulator', and the 'light source controller' in the claims of the invention.

B. Light Source Control and Light Modulation Processing in First Embodiment

Figure 3:
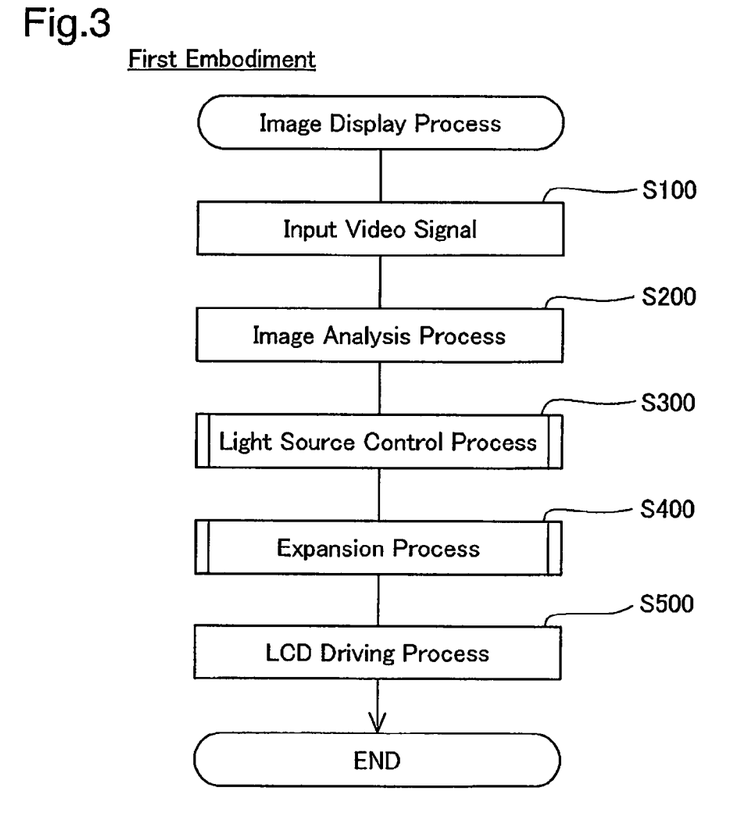
FIG. 3 is a flowchart showing an image display process routine executed in a first embodiment of the invention.

FIG. 3 is a flowchart showing an image display process routine executed in a first embodiment of the invention. The image display process controls the outputs color lights of the three colors R, G, and B from the three illumination optical systems 110R, 110G, and 110B to display a resulting processed image on the screen SC. The output control of the color lights aims to reduce the power consumption. The image display process routine is triggered, for example, in response to external input of a video signal (step S100).

The image analyzer 212 of the color light modulation processing module 210 performs an image analysis process at step S200. The image analysis process analyzes image data included in the input video signal, computes the R, G, and B tone values of the respective pixels, and computes and outputs the required light intensities of the respective colors R, G, and B to express an object image by the computed R, G, and B tone values. One procedure of computing the required light intensities creates histograms of the tone values of the respective colors R, G, and B, and subtracts preset tone values from maximum tone values representing the brightest values in the R, G, and B histograms. The reduction of the preset tone values aims to minimize the noise effects.

The light source control module 250 performs a light source control process at step S300. The light source control process controls the outputs of the R, G, and B color lights from the three illumination optical systems 110R, 110G, and 110B according to the required light intensities computed by the image analyzer 212. At subsequent step S400, the expansion processing unit 214 of the color light modulation processing module 210 performs an expansion process (described later). Based on a result of the expansion process, the LCD driver 216 of the color light modulation processing module 210 drives the three liquid crystal light valves 120R, 120G, and 120B (step S500).

Figure 4:
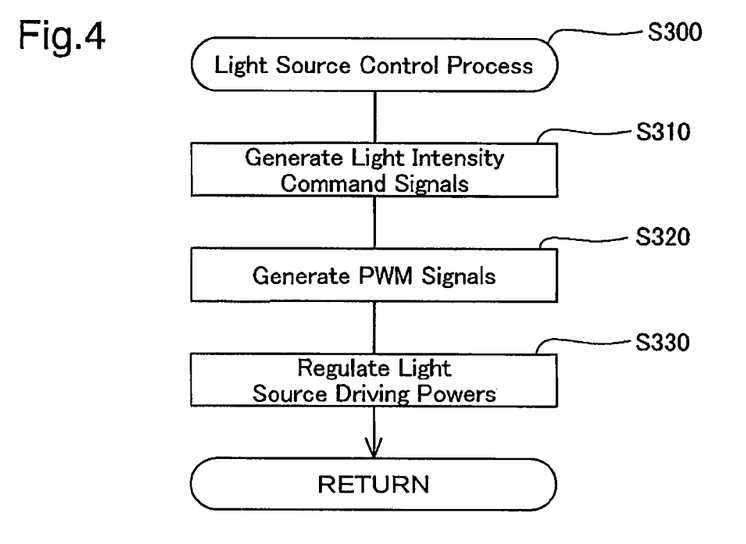
FIG. 4 is a flowchart showing the details of the light source control process executed at step S300 in the image display process of the first embodiment.

FIG. 4 is a flowchart showing the details of the light source control process executed at step S300 in the image display process of the first embodiment. At step S310, the light intensity instruction unit 252 of the light source control module 250 sets the computed required light intensities of the R, G, and B color lights to target values, performs feedback control with observed light intensity feedback signals of the respective colors R, G, and B to generate light intensity command signals, and outputs the generated light quantity command signals to the PWM signal generator 254.

The PWM signal generator 254 of the light source control module 250 performs a PWM signal generation process at step S320. The PWM signal generation process modulates the pulse widths according to the light intensity command signals and outputs PWM signals to the light source drive unit 256. The light source drive unit 256 of the light source control module 250 then regulates the light source driving powers to be supplied to the three illumination optical systems 110R, 110G, and 110B corresponding to the PWM signals (step S330).

This series of processing enables output of the minimum possible light intensities from the respective light source for expression of an object image to be displayed on the screen SC. For example, when the object image to be displayed is a reddish image and has tone values of 64 at the maximum for the green and blue color lights, the green and blue illumination optical systems 110G and 110B are required to output the sufficient light intensities for expression of the 64 tone values. Such control enables more efficient reduction of the power consumption than the conventional light reduction control of a white color light source.

The inventors of The invention have discovered that the light reduction control of the respective R, G, and B color lights causes a problem of the lowered hue fidelity, unlike the light reduction control of the white color light source. The invention is completed as the novel technical approach to solve the newly discovered problem, that is, the lowered hue fidelity. The lowered hue fidelity is ascribed to the following cause, for example, in the liquid crystal projector.

Figure 5:
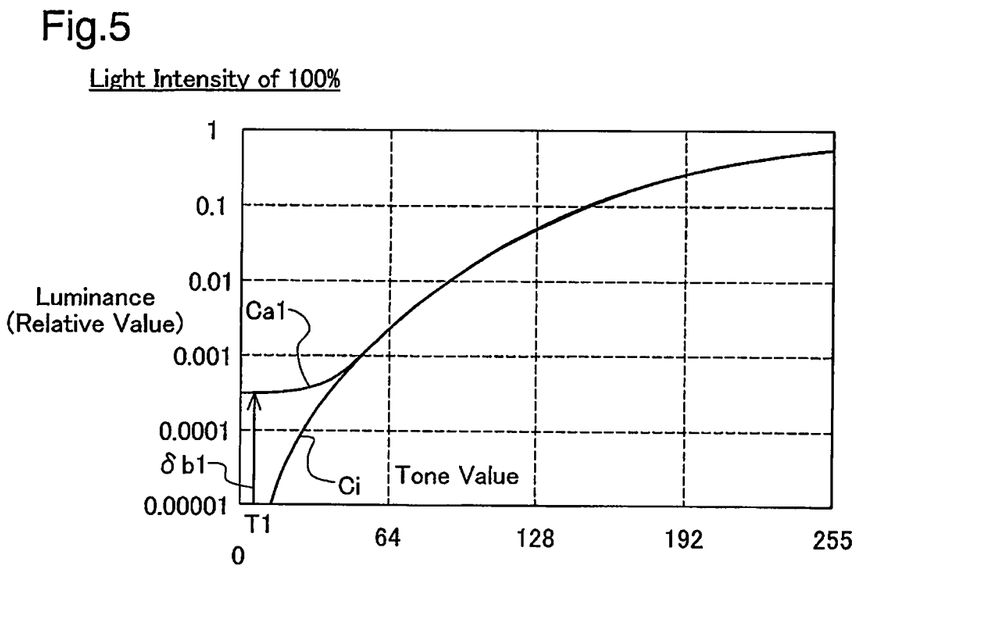
FIG. 5 is a logarithmic graph representing the luminance characteristic of the liquid crystal projector 10 under the condition of the output light intensities of 100% from the illumination optical systems.

FIG. 5 is a logarithmic graph representing the luminance characteristic of the liquid crystal projector 10 under the condition of the output light intensities of 100% from the illumination optical systems 110R, 110G, and 110B. The luminance characteristic is expressed by the relationship between the tone values representing the transmittances of the three liquid crystal light valves 120R, 120G, and 120B and the (relative) luminance of the liquid crystal projector 10. For the white balance at each tone value, the absolute values of the luminance (generally varying) are not significant, but luminance profiles as variation curves of luminance against the tone value are of great importance. The R, G, and B color lights are thus required to have luminance profiles of sufficiently similar shapes for the white balance.

A curve Ci shows a theoretical luminance profile representing the ideal luminance characteristic. A curve Ca1 shows an observed luminance profile representing the actual luminance characteristic of the liquid crystal projector 10. As clearly shown in the graph of FIG. 5, the observed luminance profile Ca1 is deviated from the theoretical luminance profile Ci especially in a region of low tone values. For example, there is a luminance difference $\delta b1$ at a tone value T1. The luminance difference $\delta b1$ at the tone value T1 is ascribed to a slight decrease in light intensity under the condition that the three liquid crystal light valves 120R, 120G, and 120B are required to have the transmittance of '0'. Namely the luminance difference $\delta b1$ is caused by the performance limits of the three liquid crystal light valves 120R, 120G, and 120B.

Figure 6:
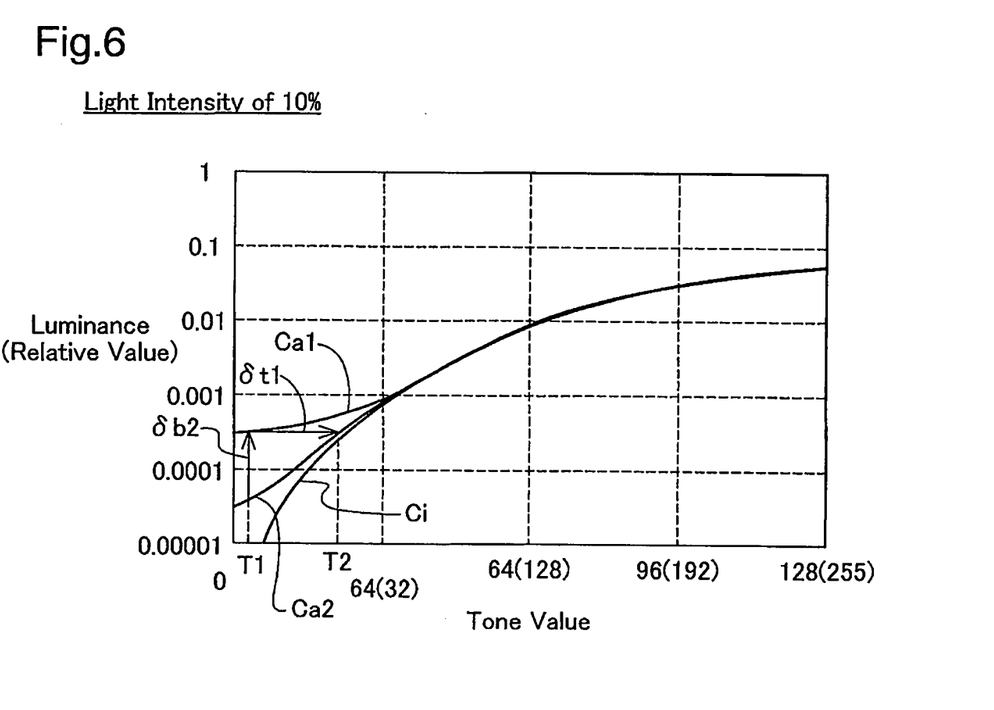
FIG. 6 is a logarithmic graph representing the luminance characteristic of the liquid crystal projector 10 under the condition of the output light intensities of 10% from the illumination optical systems.

FIG. 6 is a logarithmic graph representing the luminance characteristic of the liquid crystal projector 10 under the condition of the output light intensities of 10% from the illumination optical systems 110R, 110G, and 110B. Like the graph of FIG. 5, the theoretical luminance profile Ci represents the ideal luminance characteristic, and the observed luminance profile Ca1 represents the actual luminance characteristic of the liquid crystal projector 10 at the output light intensity of 100%. Another observed luminance profile Ca2 represents the actual luminance characteristic of the liquid crystal projector 10 at the output light intensity of 10%. The values in parentheses denote the tone values after the expansion process.

As shown in FIG. 6, the luminance profile Ca2 is deviated from the luminance profile Ca1 especially in a range of low tone values. For example, there is a luminance difference $\delta b2$ at a tone value T1. The luminance difference $\delta b2$ at the tone value T1 is ascribed to the lowered light intensities of the illumination optical systems 110R, 110G, and 110B to 10% under the condition that the transmittances of the three liquid crystal light valves 120R, 120G, and 120B decrease to the minimum level of the hardware limitation. Namely the luminance difference $\delta b2$ is caused by the lowered light intensities of the illumination optical systems 110R, 110G, and 110B and the resulting lowered luminance under the condition of the fixed transmittances of the three liquid crystal light valves 120R, 120G, and 120B.

In this manner, the light reduction control of the respective R, G, and B color lights causes the shape mismatch of the two luminance profiles Ca1 and Ca2. This results in the problem of the lowered hue fidelity. The inventors of the invention have readily solved this problem by the expansion process described below.

Figure 7:
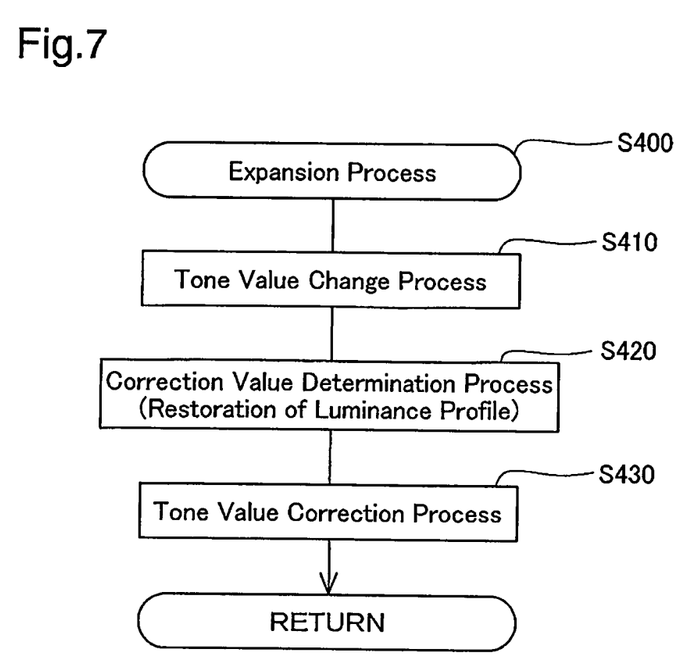
FIG. 7 is a flowchart showing the details of the expansion process executed at step S400 in the image display process of the first embodiment.

FIG. 7 is a flowchart showing the details of the expansion process executed at step S400 in the image display process of the first embodiment. The expansion process corrects the tone values corresponding to the degrees of light reduction of the respective R, G, and B color lights and accordingly restores the shape of the luminance profile Ca1 with no light reduction control of the respective R, G, and B color lights. This enables mutual matching of the shapes of the luminance profiles with regard to the respective R, G, and B color lights.

At step S410, the expansion processing unit 214 performs a tone value change process. The tone value change process changes the tone values to increase the transmittances of the liquid crystal light valves 120R, 120G, and 120B according to the decreases of the light intensities output from the illumination optical systems 110R, 110G, and 110B. The decreases of the light intensities output from the illumination optical systems 110R, 110G, and 110B are determined corresponding to the required light intensities input from the image analyzer 212. In the illustrated example, the luminance at the transmittance of the tone value '128' in the light intensity of 100% (see FIG. 5) is identical with the luminance at the transmittance of the tone value '255' in the light intensity of 10% (see FIG. 6). The tone value is accordingly changed from 128 to 255 corresponding to the light reduction control to the light intensity of 10%.

At step S420, the expansion processing unit 214 performs a correction value determination process. The correction value determination process determines the correction values for restoration of the shape of the luminance profile Ca1 with no light reduction control of the respective R, G, and B color lights. At step S430, the expansion processing unit 214 performs a tone value correction process to correct the tone values with the determined correction values. In the illustrated example of FIG. 6, there is the luminance difference $\delta b2$ at the tone value T1. Application of a tone correction value $\delta t1$ shifts the tone value T1 to a tone value T2 and accordingly makes the luminance profile Ca2 match with the luminance profile Ca1. In the structure of this embodiment, the tone correction values $\delta t1$ are stored in advance in the form of a correction LUT 214T in the expansion processing unit 214. The correction LUT 214T may be constructed as a table of outputting a tone correction value or outputting a corrected tone value in response to two inputs of the degree of light reduction and the changed tone value.

Storage of a two-dimensional table of outputting either the tone correction value or the corrected tone value in response to the two inputs of the degree of light reduction and the changed tone value, however, undesirably occupies a large memory capacity. In order to save the memory capacity, correction values at the expected maximum degrees of light reduction may be stored as a one-dimensional table. The correction value from the one-dimensional table is multiplied by a coefficient corresponding to the degree of light reduction The procedure of the first embodiment makes corrections in the expansion process and thereby readily solves the problem of the lowered hue fidelity caused by the light reduction control of the respective R, G, and B color lights without requiring modification of the hardware structure.

The procedure of the first embodiment corrects the tone values corresponding to the degrees of light reduction with regard to the respective R, G, and B color lights to restore the shape of the luminance profile Ca1 with no color reduction control of the respective R, G, and B color lights and attain mutual matching of the luminance profiles of with regard to the multiple color lights. The correction of the tone values to attain the mutual matching is, however, not essential, but the object is a sufficiently small difference of the hue. The correction of the tone values may thus be preformed to make luminance profiles of multiple color lights sufficiently close to the shape of a luminance profile with no color reduction control. The mutual matching of luminance profiles of multiple color lights is also not essential in a second embodiment described below.

C. Light Source Control and Light Modulation Process in Second Embodiment

Figure 8:
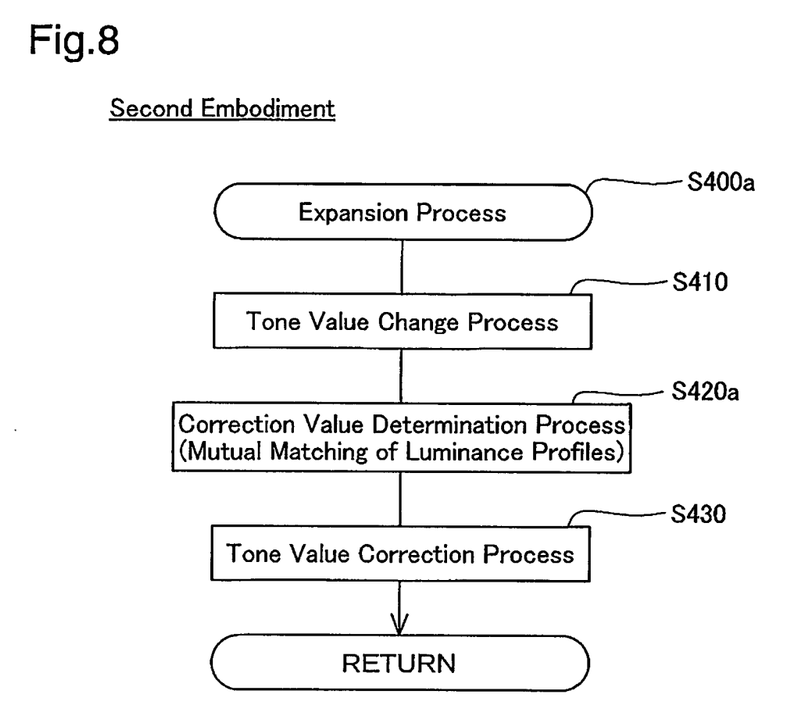
FIG. 8 is a flowchart showing the details of an expansion process executed in an image display process of a second embodiment.

FIG. 8 is a flowchart showing the details of an expansion process executed in an image display process of a second embodiment. The image display process of the second embodiment is similar to the image display process of the first embodiment, except replacement of step S420 in the expansion process (step S400) with step S420$a$ in an expansion process (step S400$a$). The procedure of the second embodiment solves the problem of the lowered hue fidelity and further modifies the tone value correction in the expansion process to enhance the contrast ratio (dynamic range). The contrast ratio is given as a ratio of a luminance in the brightest state (maximum luminance) to a luminance in the darkest state (minimum luminance) in image expression. The higher contrast ratio represents the higher light and dark expressiveness. The procedure of the second embodiment restricts an increasing degree of the minimum luminance and enhances the contrast ratio to improve the black level problem and improve the black level reproduction.

Figure 9:
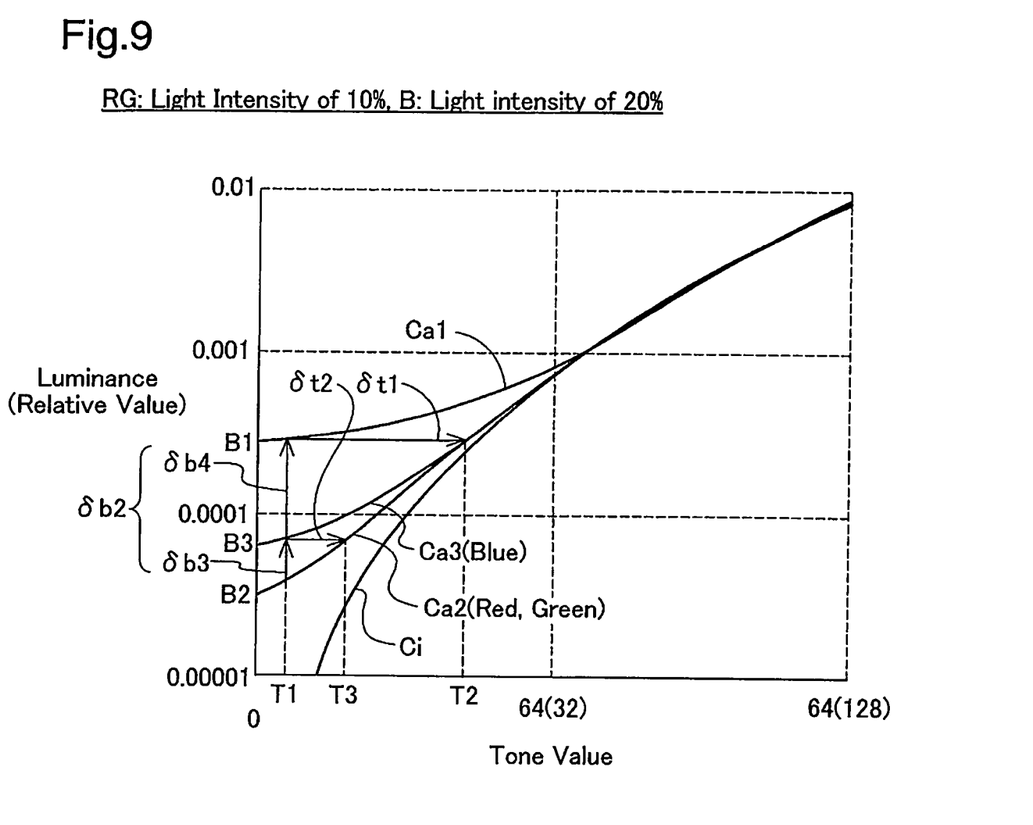
FIG. 9 shows an illustrated example of the expansion process of the second embodiment.

In the illustrated example of FIG. 9, the expansion process of the second embodiment is adopted to attain the mutual matching of luminance profiles under the condition of the lowered light intensity to 10% with regard to the R and G color lights and the lowered light intensity to 20% with regard to the B color light. There is a luminance difference δb2 (=luminance difference δ3+luminance difference δ4) at a tone value T1 with regard to the R and G color lights. As described above with reference to the graph of FIG. 6, the procedure of the first embodiment applies a tone correction value δt1 to shift the tone value T1 to a tone value T2 and accordingly make a luminance profile Ca2 match with a luminance profile Ca1. There is a luminance difference δb4 at the tone value T1 with regard to the B color light. Application of the tone correction value δt1 shifts the tone value T1 to the tone value T2 and accordingly makes a luminance profile Ca3 match with the luminance profile Ca1. For the simplicity of explanation, the luminance profiles Ca2 and Ca3 are assumed to have an identical luminance value (relative value) at the tone value T2.

The procedure of the first embodiment makes the luminance profiles Ca2 and Ca3 with the color reduction control match with the luminance profile Ca1 with no color reduction control. This leads to an increase in minimum luminance. The luminance profile Ca2 with the light reduction control originally has a luminance value B2 as the minimum luminance. The processed luminance profile Ca2 matching with the luminance profile Ca1 with no color reduction control, however, has a luminance value B1 as the minimum luminance. Similarly the luminance profile Ca3 with the light reduction control originally has a luminance value B3 as the minimum luminance. The processed luminance profile Ca3 matching with the luminance profile Ca1 with no color reduction control, however, has the luminance value B1 as the minimum luminance. Namely the tone value correction of the first embodiment interferes with the enhancement of the contrast ratio, which is expected as the additional effect of the light reduction control.

The inventors of the invention have noted that restoration of the luminance profile with no light reduction control is not essential for the improved hue fidelity but that mutual matching of luminance profiles with regard to the R, G, and B color lights is satisfactory for the improved hue fidelity. Based on such findings, the inventors have provided a novel technical approach to enhance the contrast ratio as step S420$a$ in the expansion process of the second embodiment.

At step S420$a$ in the expansion process of the second embodiment (FIG. 8), the expansion processing unit 214 determines the correction values to make luminance profiles of other color lights match with a luminance profile of a specific color light having the lowest degree of light reduction. In the illustrated example of FIG. 9, the tone correction values are determined to make the luminance profiles Ca2 of the R and G color lights match with the luminance profile Ca3 of the B color light. There is a luminance difference δb3 between the luminance profile Ca2 and the luminance profile Ca3. A tone correction value δt2 is determined at step S420$a$ for elimination of this luminance difference δb3. Application of the tone correction value δt2 shifts the tone value T1 to a tone value T3 and thereby makes the luminance profile Ca2 match with the luminance profile Ca3. No tone value correction is required for the luminance profile Ca3 of the B color light.

The procedure of the second embodiment makes the luminance profile Ca2 under the light reduction control to the light intensity of 10% match with the luminance profile Ca3 under the light reduction control to the light intensity of 20%. This restricts the increasing degree of the minimum luminance. While the procedure of the first embodiment increases the minimum luminance to the luminance value B1, the procedure of the second embodiment increases the minimum luminance to only the luminance value B3.

As described above, the procedure of the second embodiment determines the tone correction values to make the luminance profiles of the other color lights match with the luminance profile of the specific color light having the lowest degree of light reduction. This arrangement advantageously restricts the increase of the minimum luminance and enhances the contrast ratio.

D. Modifications

The embodiments discussed above are to be considered in all aspects as illustrative and not restrictive. There may be many modifications, changes, and alterations without departing from the scope or spirit of the main characteristics of the invention. Some examples of possible modification are given below.

D-1. In the first and the second embodiments described above, the decreases of the light intensities output from the illumination optical systems 110R, 110G, and 110B are determined corresponding to the required light intensities input from the image analyzer 212 (see FIG. 2). The decreases of the light intensities output from the illumination optical systems 110R, 110G, and 110B may alternatively be determined in response to the light intensity feedback signals output from the light sensors 192R, 192G, and 192B. In this modification, the tone value correction is not based on the required light intensities used as the 'target values' in the feedback control by the light source control module 250 but is based on the observed light intensities of the illumination optical systems 110R, 110G, and 110B. This modified arrangement eliminates the effect of a potential deviation of the actual values from the 'target values' due to individual differences or time change and ensures the highly accurate control.

D-2. The first and the second embodiments regard the liquid crystal projector 10 adopting transmissive liquid crystal. The technique of the invention is, however, not restricted to the liquid crystal projectors of transmissive liquid crystal but is also applicable to liquid crystal projectors of reflective liquid crystal and projectors of other mechanisms including DLP (registered trademark) projectors and electromechanical projectors. The technique of the invention is applicable to a rear-type projector as well as the front-type projector described in the above embodiments.

When part or all of the functions of the invention are actualized by the software configuration, the software (computer program) may be provided as storage in a computer readable recording medium. The terminology 'computer readable recording medium' in the specification hereof is not restricted to portable recording media such as flexible disks and CD-ROMS but includes diversity of internal storage devices built in the computer, for example, RAMs and ROMS, as well as diversity of external storage devices attached to the computer, for example, hard disks.

Finally, the present application claims the priority based on Japanese Patent Application No. 2006-213190 filed on Aug. 4, 2006, which are herein incorporated by reference.

What is claimed is:

1. An image display method of displaying an image on a projection plane in response to an input video signal, the method comprising steps of:
    emitting each of multiple color lights having mutually different hues;
    modulating the each of the multiple color lights based on the video signal;
    controlling light emission amounts of at least one specific color light individually, based on an analyzed result of the video signal;
    determining degrees of the control of an amount of light emission of the specific color light based on the video signal;
    changing tone values of the specific color of each pixel of the video signal to a greater tone value so that an amount of decrease in a luminance value of the modulated color light of the specific color associated with a decrease of the light emission amount of the color light of the specific color as a result of the controlling light emission amounts of the specific color light is reduced;
    correcting the changed tone values of the video signal in a region of low tone values to generate a driving signal, for providing the modulation; and
    determining a correction value for the tone value correction based on the determined degrees of the control of the amount of light emission of the specific color light, wherein
    the tone values are corrected such that a plurality of luminance profiles of the multiple color lights approximate each other, the plurality of luminance profiles being varied independently by controlling the amounts of light emission of the specific color light, and each of the plurality of luminance profiles representing a relation between the tone value and relative luminance value for each of the modulated multiple color light.

2. The method according to claim 1, wherein the tone value are corrected on each of the multiple color lights, for reducing the variations of the respective luminance profiles caused by the control of the amounts of light emission of the specific color light.

3. The method according to claim 1, wherein the tone values are corrected on each of the multiple color lights, for making the luminance profiles of all other color lights approach to the luminance profile of a specific color light having a smallest amount of light reduction by the control of the amount of light emission among the multiple color lights.

4. The method according to claim 1, further comprising a step of:
    determining a correction value for the tone value correction, by multiplying a correction value for an expected maximum degree of light reduction by a factor specified corresponding to an amount of light reduction.

5. An image display apparatus for displaying an image on a projection plane in response to an input video signal, the apparatus comprising:
    multiple light sources that emit each of the multiple color lights having mutually different hues;
    a light modulator that modulates the each of the multiple color lights based on the video signal;
    a light source controller that individually controls light emission amounts of at least one specific color light, based on an analyzed result of the video signal; and
    a color light modulation processing module that: (1) determines degrees of the control of an amount of light emission of the specific color light based on the input video signal, (2) changes tone values of the specific color of each pixel of the video signal to a greater tone value so that an amount of decrease in luminance value of the modulated color light of the specific color associated with a decrease of the light emission amount of the color light of the specific color as a result of the controlling light emission amounts of the specific color light is reduced, and (3) corrects the changed tone values of the video signal in a region of low tone values to generate a driving signal, for providing the modulation, wherein
    the color light modulation processing module determines a correction value for the tone value correction based on the determined degrees of the control of the amount of light emission of the specific color light; and
    the color light modulation processing module performs the tone value correction such that a plurality of luminance profiles of the multiple color lights approximate each other, the plurality of luminance profiles being varied independently by the control of the amounts of light emission of the specific color light, and each of the plurality of luminance profiles representing a relation between the tone value and relative luminance value for each of the multiple color light modulated by the modulation.

* * * * *